Figure 3:
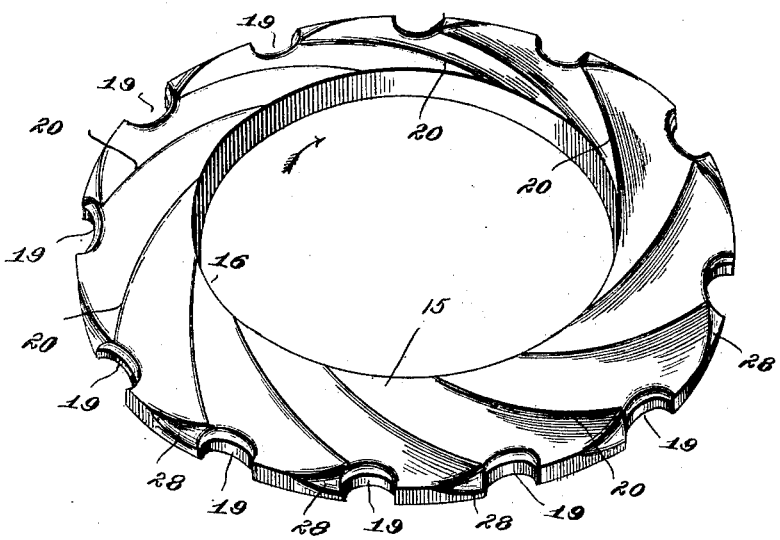

No. 679,557.　　　　　　　　　　　　　　　　Patented July 30, 1901.
E. E. ENGLUND.
CORN PLANTER.
(Application filed Feb. 13, 1901.)

(No Model.)　　　　　　　　　　　　　　　　　2 Sheets—Sheet 1.

Fig. 1.

Fig. 2.

Witnesses:　　　　　　　　　　　　　　　Inventor
　　　　　　　　　　　　　　　　　　　Ernst Emil Englund
　　　　　　　　　　　　　　　by Bond, Adams, Pickard & Jackson
　　　　　　　　　　　　　　　　　　　his Attys.

THE NORRIS PETERS CO., PHOTO-LITHO., WASHINGTON, D. C.

No. 679,557. Patented July 30, 1901.
E. E. ENGLUND.
CORN PLANTER.
(Application filed Feb. 13, 1901.)
(No Model.) 2 Sheets—Sheet 2.

UNITED STATES PATENT OFFICE.

ERNST EMIL ENGLUND, OF MOLINE, ILLINOIS, ASSIGNOR TO THE D. M. SECHLER CARRIAGE COMPANY, OF ILLINOIS.

CORN-PLANTER.

SPECIFICATION forming part of Letters Patent No. 679,557, dated July 30, 1901.

Application filed February 13, 1901. Serial No. 47,186. (No model.)

*To all whom it may concern:*

Be it known that I, ERNST EMIL ENGLUND, a citizen of the United States, residing at Moline, in the county of Rock Island and State of Illinois, have invented certain new and useful Improvements in Seeding Devices for Corn-Planters, of which the following is a specification, reference being had to the accompanying drawings.

My invention relates to seeding devices for corn-planters, and particularly to the seeding devices which are located in the bottom of the seed box or hopper, consisting, generally, of a seed-plate or rotary seed-ring containing seed cups or pockets, a cover-plate, and accompanying devices.

It relates more particularly to that class of seed-valves in which the grains of corn are received one at a time in pockets in the seed-plate and by the rotation of the seed-plate deposited one at a time into the ground through the medium of the seed-tube and accompanying mechanism. It is a well-known fact that while grains of corn differ considerably from each other in their length and width they differ much less in their thickness—that is to say, in their narrowest diameter—and that therefore seeding devices of the character above described which are so designed as to receive grains of corn one at a time edgewise into the seed-cups and which are so shaped and constructed as to only receive a grain of corn in that position are much more accurate in the depositing of corn and much surer to receive into each seed-cup one grain of corn and only one, and, as was said, to insure an accurate dropping.

My invention therefore relates, further, more particularly to seeding devices which are adapted to receive grains of corn one at a time edgewise into the cups upon the seed-ring or seed-plate; and it is an object of my invention to provide a seed-plate and accompanying devices which will insure the delivery of the grains of corn edgewise into the seed-cups and will insure each seed-cup receiving one grain of corn and only one.

It is another object of my invention to provide a new and improved form of seed-ring or seed-plate which will insure the delivery of grains of corn edgewise to the seed-cups and the dropping into each seed-cup of one grain of corn and only one.

Another object of my invention is to provide a new and improved form of seed-plate and cover-plate which will insure the delivery of the grains of corn edgewise to the seed-cups and the delivery into each seed-cup of one grain of corn and only one.

Another object of my invention is to provide a new and improved form of seed-valve and cover-plate which will agitate the corn in the seedbox, and thereby assist in insuring the delivery of grains of corn edgewise to the seed-cups and the delivery into each seed-cup edgewise of one grain of corn and only one.

I accomplish these objects as hereinafter specified, and as illustrated in the drawings.

That which I regard as new will be set forth in the claims.

In the drawings, Figure 1 is a top or plan view of a seedbox with my improved seed-plate and cover-plate located in position therein. Fig. 2 is a vertical section on line 2 2 of Fig. 1, and Fig. 3 is a perspective view of a new and improved seed-plate.

4 indicates the seedbox, shown in Fig. 2 as cut away.

5 indicates the bottom of the seedbox, secured to the sides 4 in any appropriate manner. The bottom 5 is provided at its top with a sloping surface 6, which slopes downward and inward, as is best shown in Fig. 2, for a suitable distance. Below the sloping surface 6 is an upright portion 7, which forms a circular ring, within which and in close proximity to which the seed-plate hereinafter described revolves.

8 indicates a circumferential shelf or shoulder upon which the seed-plate rests and rotates.

9 indicates a gear-ring which rests upon a circular rabbet 10 in the bottom 5 of the seedbox, so as to rotate thereon. The gear-ring 9 is provided with gear-teeth 11, which project below its lower surface into a suitable circular recess 12 in the bottom of the seed-plate.

13 indicates a beveled gear which projects through a suitable opening in the bottom of the seed-plate to engage with the gear-teeth 11 of the gear-ring 9. The beveled gear 13 is secured to a suitable shaft 14, which is driven in any well-known and approved way.

15 indicates an annular seed-plate, which rests upon the shoulder 8. The seed-plate 15 is provided on its under surface with a circumferential shoulder 16, which has suitable slots in it to engage with lugs 17 upon the gear-ring 9, so that the seed-plate 15 may be rotated with the rotation of the gear-ring. The slots and lugs may be of any well-known and approved form and construction. As is best shown in Fig. 2, the seed-plate 15 is formed with its upper surface beveled downward from its center—that is to say, sloping downward from its inner edge toward its periphery—and is provided upon its outer surface with a number of seed-cups 18, which are cut into the seed-plate from its exterior periphery, so as to be open at the outer periphery of the seed-plate. The seed-cups 18 are elongated circumferentially and narrow radially of the seed-plate and are of such width radially as to receive a grain of corn edgewise, and only edgewise, therein, and are of such length circumferentially of the seed-plate as not to receive more than one grain. They are also of a sufficient depth to receive a single grain of corn standing edgewise therein. The seed-cups also, at a short distance above their bottoms, are recessed inward and outward of said plate, so as to provide enlargements 19, as is best shown in Fig. 2, in order to assist the delivery of grains of corn into the seed-cups. The portion 7 of the seedbox 6 when the seed-plate 15 is in position is close to the outer periphery of the seed-plate, so as to prevent the escape of the grains of corn from the seed-cups and hold them upright therein during the rotation of the seed-plate 15 until they pass under the cut-off and are dropped into the seed-tube. The upper surface of the seed-plate 15 is cut so as to form a number of ridges 20. The ridges 20, as is best shown in Figs. 1 and 3, are preferably slightly curved and extend outward from the inner periphery of the seed-plate 15 in a direction substantially tangential to said inner periphery. The ridges 20 are preferably of the same number as the seed-cups in the seed-plate. From the bottom of each ridge 20 the surface of the seed-cup is sloped or beveled upward to the top of the next ridge, as is best shown in Fig. 3. The ridges are made of a suitable depth, which is approximately shown in Fig. 3 of the drawings; but this may be varied as experience may demand.

21 indicates a cover-plate which is mounted upon a boss or stud 22, projecting upward from the bottom 5 of the seedbox, and is secured thereto by a screw 23 and thumb-nut 24. The cover-plate 21 is provided with cut-off mechanism 25, which may be of any approved form and construction, and hence is not shown in detail here. The cover-plate 21 is provided on its outer periphery with a number of projecting teeth or fingers 26, which, as is best shown in Fig. 1, are shaped somewhat like the teeth of a circular saw and project diagonally outward from the periphery of the cover-plate 21 to a point near the outer periphery of the seed-plate 15, whereby grains of corn carried around by the seed-plate cannot pass between the outer extremities of the fingers 26 and the inner surface of the bottom of the seedbox except when standing partially edgewise. The outer surface of the teeth or fingers 26 is preferably curved, as is best shown in Fig. 1, and starts from the outer periphery of the circular portion of the seed-plate upon a line substantially tangential thereto, and the said outer edge of the fingers 26 is beveled slightly backward and inward, as is best shown in Fig. 1. The fingers 26 project from the periphery of the circular portion of the cover-plate 21 in a direction opposite to that of the ridges 20 in the seed-plate 15, so as to cross the same, as is best shown in Fig. 1. The upper surface of the cover-plate 21 is beveled or sloped downward and outward from its center toward its periphery, and the fingers 26 are bent downward, so that their under surfaces conform to the upper surface of the seed-plate 15 and lie in close proximity thereto, but not close enough, of course, to prevent the free rotation of the seed-plate 15, in order to prevent the passing or wedging of any grain of corn between said fingers and said seed-plate. The number of the fingers 26 may be varied, of course, to suit the demands of the case, as experience may dictate. In order to assist in the delivery of the grains of corn into the seed-cups, the seed-plate 15 is provided with bevels 28, cut in advance of said seed-cups and sloping downward and inward toward said seed-cups.

The operation of the devices above shown and described is as follows: The seed-plate 15 being rotated in the direction shown by the arrow in Fig. 1, the ridges 20 pass continuously below the fingers 26 and operate in connection with the fingers 26 to stir or agitate the corn in the seedbox. By means of the surfaces of the cover-plate and seed-plate sloping downward from the center toward the periphery the grains of corn constantly tend to fall or slide toward the inner periphery of the seedbox into the recess formed between the sloping portion 6 of the seedbox and the cover-plate 21. As the ridges 20 strike the grains of corn lying upon the seed-plate they tend to carry them forward in the direction of the rotation of the seed-plate, and as the ridges 20 so carry the grains of corn forward they bring them against the outer surfaces of the fingers 26, which slide the grains of corn outward toward the periphery of the seed-plate. In case any seed-cup has not already been filled with a grain of corn standing edgewise therein the action of the fingers 26, as the grains of corn are carried forward by the seed-plate and slid outward by the fingers, is to tip any grain of corn which may be lying flat upward on edge as it is carried by the rotation of the seed-plate to the point of the finger, and as the seed-cup, which may be empty, passes by said finger to urge the grain of corn edgewise into said seed-cup, thereby insuring each seed-cup receiving one grain of corn, and only one grain, standing edgewise therein. As the seed-cups, thus holding each a single grain of corn edgewise, pass under the cut-off devices the cut-off operates in the usual way to hold back the surplus grains of corn and to prevent more than the one grain contained in the seed-cup from passing under the cut-off and into the seed-tube, and as the seed-cup passes over the discharge-opening 27 (indicated by dotted lines in Fig. 1) the grain of corn is discharged from the seedbox into any appropriate seed-tube, which may be of any approved form and construction and which deals with the corn so received in any well-known and approved manner.

The number of seed-cups in the seed-plate will of course be varied, according to the nature of the work done, and preferably are either twelve or sixteen in number, according to whether the above-described devices are used in a check-row planter or whether it is desired to drop three or four grains of corn at a time into the seed-tube.

It is obvious that the seeding devices above described may be used either in a drill-planter, in which case the seed-ring will be continuously driven, or in a check-row corn-planter, in which case the seed-ring may be intermittently driven in any approved manner, so as to empty the desired number of seed-cups with each partial rotation, or the seed-cups may be so arranged on the periphery of the seed-plate that the seed-plate may be driven in any well-known and approved manner, so as to deposit a given number of grains for each operation of any check-rower devices that may be used.

I have shown the ridges on the upper surface of the seed-plate as slightly curved and running outward in a direction which starts on a line substantially tangential to the inner periphery of the seed-plate and the fingers on the cover-plate as extending diagonally outward therefrom, with their outer sides slightly curved and projecting from the cover-plate in a direction which starts out upon a line substantially tangential to the periphery of the cover-plate, and this is the shape and construction which I prefer to use. The angle or direction of said ridges on the upper surface of the seed-plate and of said fingers on the cover-plate may, however, each or both be varied considerably from this tangential line without departing from the spirit of my invention as long as the said ridges on the seed-plate and the fingers on the cover-plate when the parts are in position cross each other at such angle that when the seed-plate is rotated the point of intersection will move outward toward the periphery of the seed-plate, so as to agitate the corn in the hopper and also tend to carry the grains of corn onward in the direction of rotation of the seed-cups and outward toward the periphery of the seed-cups. The ends of the fingers extending as they do so near the inner sides of the seed-cups as to prevent single grains of corn lying flat from passing between the ends of the fingers and the ring exterior to said seed-cups tend to turn such grains of corn up on edge as they pass the fingers, so as to insure the delivery of single grains standing on edge into the seed-cups. I have also shown the seed-plate with the seed-cups cut in from its outer periphery and with the circular wall, which when the parts are in position forms the outer side of the seed-cups, as stationary and a part of the bottom of the seedbox. It is obvious also that this construction may be varied without departing from the spirit of my invention in this respect, provided the seed-cups when the parts are in position are elongated circumferentially and narrow radially of said seed-plate, so that each seed-cup may receive only one grain of corn standing on edge therein.

That which I claim as my invention, and desire to secure by Letters Patent, is—

1. A seed-plate provided with seed-cups and having on its upper surface a plurality of ridges extending across its upper surface diagonally of the radii of said seed-plate, substantially as described.

2. A seed-plate provided with seed-cups at its outer periphery and having its upper surface sloping downward toward its periphery and provided with a plurality of ridges extending across its upper surface diagonally of the radii of said seed-plate, substantially as described.

3. A seed-plate provided at its outer periphery with seed-cups adapted to receive each a single grain of corn standing on edge therein, and having on its upper surface a plurality of ridges diagonal of the radii of said seed-plate, substantially as described.

4. A seed-plate provided at its periphery with seed-cups adapted to receive each a single grain of corn standing on edge therein, and having its upper surface sloping downward toward its periphery and provided with a plurality of ridges diagonal of the radii of said seed-plate, substantially as described.

5. The combination with a seed-plate provided with seed-cups at its outer periphery, of a cover-plate provided with a plurality of fingers extending outward from its periphery and diagonally of the radii of said cover-plate, and with their outer ends extending outward to points near the inner side of said seed-cups, substantially as described.

6. The combination with a seed-plate having at its outer periphery seed-cups adapted to receive each a single grain of corn standing edgewise therein, of a cover-plate provided with a plurality of fingers extending outward from its periphery and diagonally of the radii of said cover-plate to points near the inner edges of said seed-cups, substantially as described.

7. The combination with a seed-plate having upon its periphery seed-cups adapted to receive each a single grain of corn standing edgewise therein, and provided upon its upper surface with a plurality of ridges, of a cover-plate provided with fingers extending outward from its periphery to points near the inner edges of said seed-cups across the ridges on the upper surface of said seed-plate, substantially as described.

8. The combination with a seed-plate having seed-cups adapted to contain each a single grain of corn standing on edge therein, and having its upper surface sloping downward toward its periphery and provided with a plurality of ridges thereon, of a cover-plate provided with fingers extending outward from its periphery to points near the inner edges of said seed-cups across the ridges on the upper surface of said seed-plate, substantially as described.

9. The combination with a seed-plate having seed-cups adapted to contain each a single grain of corn standing on edge, and provided on its upper surface with ridges extending across said upper surface diagonally of the radii of said plate, of a cover-plate having upon its outer periphery fingers extending outward across said ridges in said seed-plate to points near the inner edges of said seed-cups, substantially as described.

10. The combination with a seed-plate provided with seed-cups adapted each to contain a single grain of corn standing on edge, and having its upper surface sloping downward toward its periphery and provided with a plurality of ridges extending across said upper surface diagonally of the radii thereof, of a cover-plate provided with fingers extending outward from its periphery to points near the inner edges of said seed-cups and extending diagonally of the radii of said cover-plate in a direction opposite to the direction of said ridges in said seed-plate, substantially as described.

11. The combination with a seed-plate provided with seed-cups adapted each to contain a single grain of corn standing on edge, and having its upper surface sloping downward toward its periphery and provided with a plurality of ridges extending across said upper surface diagonally of the radii thereof, of a cover-plate having its upper surface sloping downward toward its periphery and provided with fingers extending outward from its periphery to points near the inner edges of said seed-cups and sloping downward toward their points over said seed-plate, and extending diagonally of the radii of said cover-plate in a direction opposite from that of the ridges on said seed-plate, substantially as described.

12. The combination with a seed-plate provided with seed-cups adapted each to contain a single grain of corn standing on edge, and having its upper surface sloping downward toward its periphery and provided with a plurality of curved ridges extending across said upper surface diagonally of the radii thereof, of a cover-plate having its upper surface sloping downward toward its periphery and provided with curved fingers extending outward from its periphery to points near the inner edges of said seed-cups and sloping downward toward their points over said seed-plate, and extending diagonally of the radii of said cover-plate in a direction opposite from that of the ridges on said seed-plate, substantially as described.

13. The combination with a seedbox, of a seed-plate rotatably mounted in said seedbox, and having at its periphery seed-cups adapted each to contain one grain of corn standing edgewise therein, and having its upper surface sloping downward toward its periphery and provided with a plurality of ridges thereon, and a cover-plate provided with fingers extending outward from its periphery and across the ridges of said seed-plate to points near the inner sides of said seed-cups, substantially as described.

14. The combination with a seedbox, of a seed-plate rotatably mounted therein, and having on its periphery seed-cups adapted to contain each one grain of corn standing edgewise therein, and having its upper surface sloping downward toward its periphery and provided with a plurality of ridges thereon diagonal of the radii of said seed-plate, and a cover-plate provided with fingers extending outward from its periphery and downward so as to lie in close proximity to said seed-plate and across the ridges in said seed-plate, substantially as described.

15. The combination with a seed-plate having seed-cups at its periphery and provided with ridges on its upper surface, of a cover-plate provided with fingers extending outward from its periphery and having their operative edges crossing said ridges, whereby, when said seed-ring is rotated, the point of intersection between said ridges and the operative edge of said fingers moves outward toward the periphery of said seed-plate, substantially as described.

16. The combination with a seed-plate having seed-cups at its periphery and having its upper surface sloping downward toward its periphery and provided with ridges, of a cover-plate provided with a plurality of fingers extending outward from its periphery and having their operative edges crossing said ridges, whereby, when said seed-ring is rotated, the point of intersection between said ridges and the operative edge of said fingers moves outward toward the periphery of said seed-plate, substantially as described.

17. The combination with a seed-plate having at its periphery seed-cups adapted each to receive a single grain of corn standing on edge and having ridges on its upper surface, of a cover-plate provided with a plurality of fingers extending outward from its periphery and having their operative edges crossing said ridges, whereby, when said seed-ring is rotated, the point of intersection between said ridges and the operative edge of said fingers moves outward toward the periphery of said seed-plate, substantially as described.

18. The combination with a seed-plate having at its periphery seed-cups adapted each to receive a single grain of corn standing on edge therein and having its upper surface sloping downward toward its periphery and provided with a plurality of ridges, of a cover-plate provided with a plurality of fingers extending outward from its periphery to points near the inner sides of said seed-cups and downward over said seed-plate and having their operative edges crossing said ridges, whereby, when said seed-ring is rotated, the point of intersection between said ridges and the operative edge of said fingers moves outward toward the periphery of said seed-plate, substantially as described.

19. The combination with a seedbox, of a seed-plate rotatably mounted therein and having on its periphery seed-cups adapted to contain each one grain of corn standing edgewise therein, and having its upper surface sloping downward toward its periphery and provided with a plurality of ridges thereon diagonal of the radii of said seed-plate, and a cover-plate provided with fingers extending outward from its periphery and downward so as to lie in close proximity to said seed-plate and across the ridges in said seed-plate and extending outward to points near the inner sides of said seed-cups, substantially as described.

ERNST EMIL ENGLUND.

Witnesses:
   JOHN C. TUNNICLIFF,
   WILLIAM J. DAVIS.